United States Patent
Dube

(10) Patent No.: US 9,567,115 B2
(45) Date of Patent: Feb. 14, 2017

(54) DOOR MECHANISM FOR SATELLITE DEPLOYER SYSTEM

(71) Applicant: Victor Dube, Austin, TX (US)

(72) Inventor: Victor Dube, Austin, TX (US)

(*) Notice: Subject to any disclaimer, the term of this patent is extended or adjusted under 35 U.S.C. 154(b) by 326 days.

(21) Appl. No.: 14/445,271

(22) Filed: Jul. 29, 2014

(65) Prior Publication Data

US 2016/0031572 A1    Feb. 4, 2016

(51) Int. Cl.
*B64G 1/64* (2006.01)
*B64G 1/00* (2006.01)

(52) U.S. Cl.
CPC ............ *B64G 1/641* (2013.01); *B64G 1/002* (2013.01)

(58) Field of Classification Search
CPC ................................. B64G 1/641; B64G 1/645
See application file for complete search history.

(56) References Cited

U.S. PATENT DOCUMENTS

| 3,207,208 A | * | 9/1965 | Houk | E05F 15/605 160/189 |
| 4,416,086 A | * | 11/1983 | Niekrasz | E05D 7/04 49/388 |
| 6,003,911 A | * | 12/1999 | Sowash | E05C 17/025 16/82 |
| 6,438,794 B2 | * | 8/2002 | Ng | E05C 17/203 16/82 |
| 6,732,883 B2 | * | 5/2004 | Petzitillo, Jr. | B65F 1/16 220/813 |
| 8,642,937 B1 | * | 2/2014 | Bowen | G01J 1/08 250/203.4 |
| 8,662,562 B2 | * | 3/2014 | Ackermann | F41H 5/013 296/146.11 |
| 8,919,858 B2 | * | 12/2014 | Lee | E05C 17/20 296/146.1 |
| 2012/0192492 A1 | * | 8/2012 | Cutting | E05C 17/203 49/394 |

* cited by examiner

*Primary Examiner* — Justin Benedik
(74) *Attorney, Agent, or Firm* — Hulsey, P.C.

(57) ABSTRACT

Disclosed herein is an improved door system for a satellite deployer for storing, transporting, and deploying space payloads, as well as the method of its use. The satellite deployer's door system as described herein allows for increased efficiency due to the configuration of the mechanical structures used in the satellite deployment process.

11 Claims, 8 Drawing Sheets

DOOR MECHANISM FOR SATELLITE DEPLOYER SYSTEM

FIELD OF THE INVENTION

The present disclosure relates to a door system for more efficient deployment of payloads into space and the method of its use. More specifically, the present disclosure delineates a door system for use on a satellite deployer designed to store, transport, and deploy space payloads, such as picosatellites, including CubeSats, into space and method of its use. The door system provided herein allows for more efficient packing of satellite deployers while maintaining their functionality.

BACKGROUND OF THE INVENTION

For the purposes of interpreting the disclosure made herein, the terms "CubeSat deployer", "satellite deployer", "satellite deployer system", or derivations thereof are used interchangeably and should be considered synonymous.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Aerospace development requires (by its nature) access to space. Due to the difficulties, hazards, and costs inherent in aerospace activities, satellites have been, and will continue to be the primary means for the vast majority of extra-planetary operations. Satellites have been used in aerospace applications to explore space, gather and relay data, perform experiments, and do any other number of tasks for which their creators have designed them.

Picosatellites, including CubeSats, provide a means for minimizing the financial barrier to space entry. A CubeSat is a miniature satellite having a width of 10 cm, a height of 10 cm and a length that may be variable. Common CubeSat dimensions are "1U" (10.0×10.0×13.5 cm), or multipliers thereof, ie. "2U" (10.0×10.0×27.0 cm), and "3U" (10.0× 10.0×40.5 cm) 2U×3U (10.0×20.0×40.5 cm), etc. The components used to build CubeSats are usually relatively inexpensive, off-the-shelf, electronics. The small size of these CubeSats and other picosatellites coupled with their uniform dimensions and inexpensive components make these satellites an attractive means of accessing space at a relatively small cost.

Miniaturized satellites can simplify problems commonly associated with mass production, although few satellites of any size, other than "communications constellations" (where dozens of satellites are used to cover the globe), have been mass-produced in practice.

One reason for miniaturizing satellites is to reduce the cost associated with transporting them into space. Heavier satellites require more energy to transport them into orbit or open space, thereby requiring larger rockets with greater fuel requirements, which results in higher costs. In contrast, smaller and lighter satellites require less energy and less volume (requiring smaller and cheaper launch vehicles) and may be launched in multiples, or in other words, deployed in groups and at the same time. These small satellites, such as CubeSats and other picosatellites, can also be launched in a "piggyback" manner, using excess capacity available on already loaded launch vehicles.

The high cost of transporting mass from the surface of a stellar body into an orbit around a celestial body, or open space, has limited the development of aerospace activity. This high cost per unit mass has made minimizing the mass of the objects being sent into space particularly important.

In order to achieve their purpose, CubeSats must be transported out of the atmosphere and released into space (whether that is into an orbit around a celestial body or into open space). Satellite deployers are used to store and protect satellites during their transportation into space. These satellite deployers protect the payloads stored inside of them from damage caused by the inherent stresses resulting from launching such payloads into space. The satellite deployer must also safely and efficiently deploy their satellite payloads into the correct trajectory once the system has reached space.

The standardized specification of CubeSats also allows for the deployment means of these satellites to be standardized as well. The standardization among both payloads and deployers enables quick exchanges of payloads without the need of customized payload-deployer interfaces. It also allows for easy interchangeability of similarly dimensioned satellites.

Associated with the minimization of mass is the minimization of volume. This is important in the field of space transportation since there is a finite amount of usable storage volume inside of space vehicles.

This minimization of mass and volume is important not only for satellites, but for the systems used to store, transport and deploy the satellites.

Satellite deployers may be designed as metal storage containers into which satellites are placed. These container-type satellite deployers usually provide a door at one end, through which payloads may be loaded and unloaded. After loading, the deployer system's door is sealed, and the deployer system is then mounted onto a launch vehicle which is responsible for transporting the deployer system, including any satellites or other space payloads stored therein, into space. Once the system is in space, the deployer may then be taken through an airlock so that the deployer is in contact with space. Once the deployer is in contact with space, the deployer's door is pointed in the desired direction of deployment (away from any potential obstructions, such as other deployer's doors). The door(s) to the deployer system are then opened, and a propulsion means is used to eject the payload(s) into space in a manner conforming to predetermined parameters depending on the payload's intended use.

CubeSat deployers may have a housing that may be tubular in shape with a door which opens to reveal an open end through which the satellites may be ejected. Such satellite deployers have an onboard ejection mechanism with which can be used to supply the energy for ejecting the payloads from the interior volume of the deployer into space. This deployment means may be one or more springs, cold gas, hot gas, compressed gas, or other such energy sources (or a combination thereof) capable of imparting a force onto the space payload such that the payload is forced out of the interior volume of the deployer. The door system is used to contain the payloads during the storage phase until they are ready to be deployed. Generally this type of satellite deployment system may utilize a single door which opens wide, having a door travel path of significantly more than 90 degrees. This type of door mechanism requires a large door travel path to provide sufficient clearance so as to allow for the egress of their space payload(s).

Current deployers can carry a maximum of three 1U CubeSats. Their release mechanism generally consists of a motor with a lead screw mechanism that is used to open the door and allow for release of the payload. The combination of the maximum load and large door mechanism limits the number of CubeSats the can be deployed for a given mission.

On the International Space Station (ISS) the CubeSats and their deployers must at some point pass through the limited volume of the craft's airlock. With this restriction, and based on the dimensions of the ISS' airlock, which is known in the art, at most only six 1U CubeSats may be deployed with current deployer systems in any single airlock cycle on either the ISS itself, or on other space vehicles having similarly configured airlocks. The teachings included in the present disclosure allow for a total of eight satellite deployers loaded with six CubeSats each to pass through an airlock with similar dimensions that of the ISS in a single cycle. This results in the potential for 48 CubeSats deployments in a single airlock cycle.

A limitation of current satellite deployer technology arises as a result of the design of a deployer's openings and the associated large door travel path, or envelope. The satellite deployer's door system may rotate 180 degrees or more about a hinge when transitioning from a closed to an open configuration. A door travel path having a rotation greater than 90 degrees may impede an adjacent door system's ability to open fully and/or may compromise the open end of adjacent satellite deployers by blocking a portion of said open end. This may result in the inability to effectively use multiple satellite deployers when arranged in close proximity to one another, preventing optimal packing of the satellite deployers within the limited interior volume of space vehicles and their airlocks.

Another limitation of current satellite deployers is the lack of redundant lock-disengagement circuits. Due to the risks inherent in space activities, redundant systems are recommended in case of a malfunction, that would otherwise compromise operations.

BRIEF SUMMARY OF THE INVENTION

The purpose of this summary is to present integral concepts in a simplified form as a prelude to the more detailed disclosure that is presented herein.

The present disclosure provides a system and method for addressing the limitations of the existing technology and practices associated with deployment of CubeSat satellites.

One embodiment of the present disclosure provides a door mechanism associated with a housing compartment. This exemplary door mechanism allows for free rotation of a door from a closed position to an open and perpendicular (90° degree) position for enabling unencumbered ejection and disbursement of any housed satellites.

A further embodiment of the present disclosure provides for a door locking mechanism for restraining the door in a closed position.

A further embodiment of the present disclosure comprises a locking mechanism for releasibly retaining said door in said closed position.

A further embodiment of the present disclosure provides for a door locking mechanism comprising a ball lock.

A further embodiment of the present disclosure can be mechanically operated.

A further embodiment of the present disclosure can be electronically operated.

A further embodiment of the present disclosure comprises a load point spaced apart from said hinge.

A further embodiment of the present disclosure comprises circuitry for triggering a locking mechanism.

A further embodiment of the present disclosure comprises multiple door sections.

Descriptions of certain illustrative aspects are described herein in connection with the annexed FIGURES. These aspects are indicative of various non-limiting ways in which the disclosed subject matter may be utilized, all of which are intended to be within the scope of the disclosed subject matter. Other advantages, emerging properties, and features will become apparent from the following detailed disclosure when considered in conjunction with the associated FIGURES that are also within the scope of the disclosure.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

Entire Deployer:

The disclosed system may incorporate both a door system and a door locking mechanism, which allow the device disclosed herein to operate more efficiently and dependably than other systems known in the art.

Figure 1:
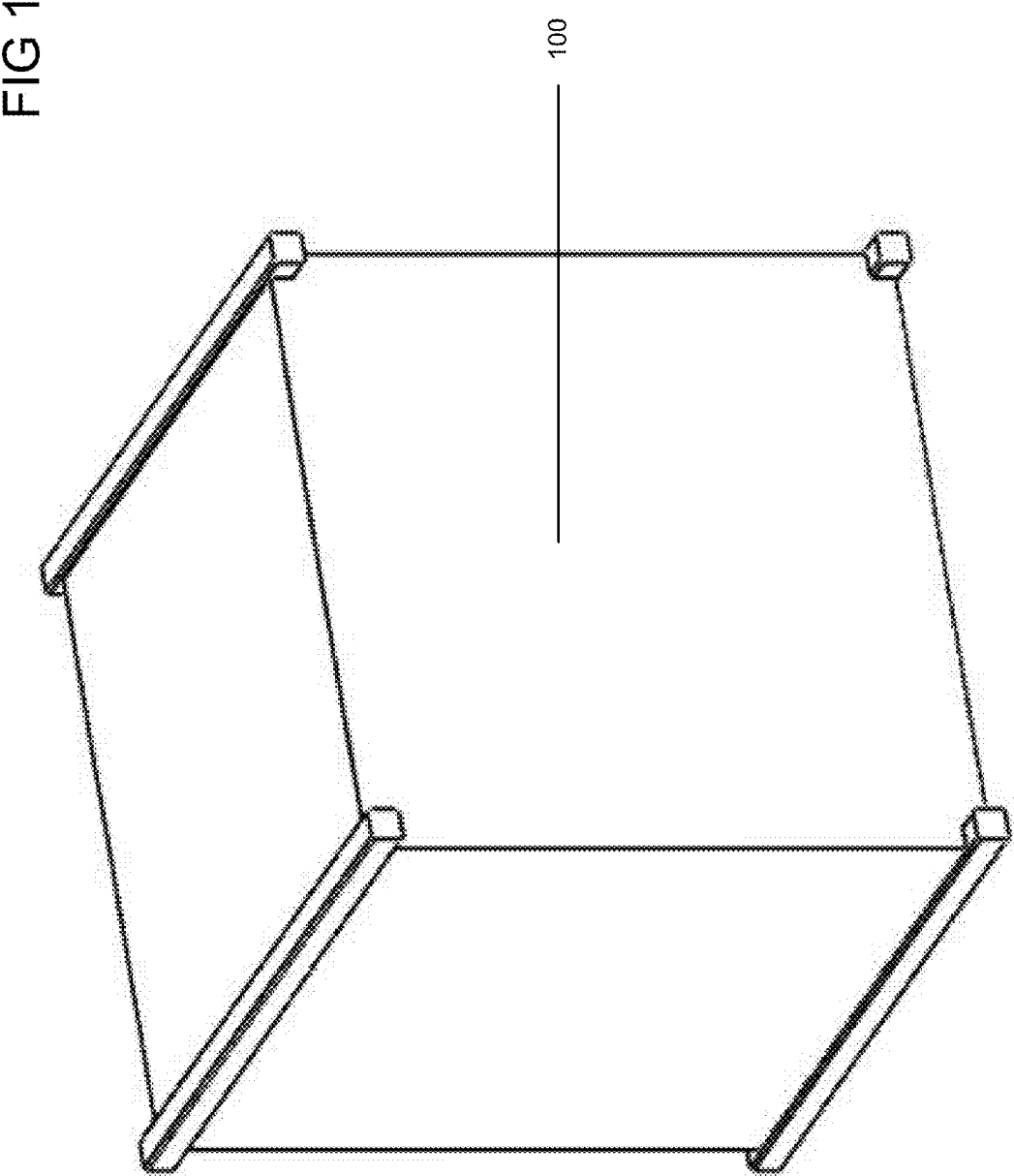
FIG. 1 illustrates an exemplary CubeSat.

FIG. 1 illustrates a simplified representation of a CubeSat 100, comprising six external surfaces, including two sides, a top, a bottom, and a back.

Figure 2:
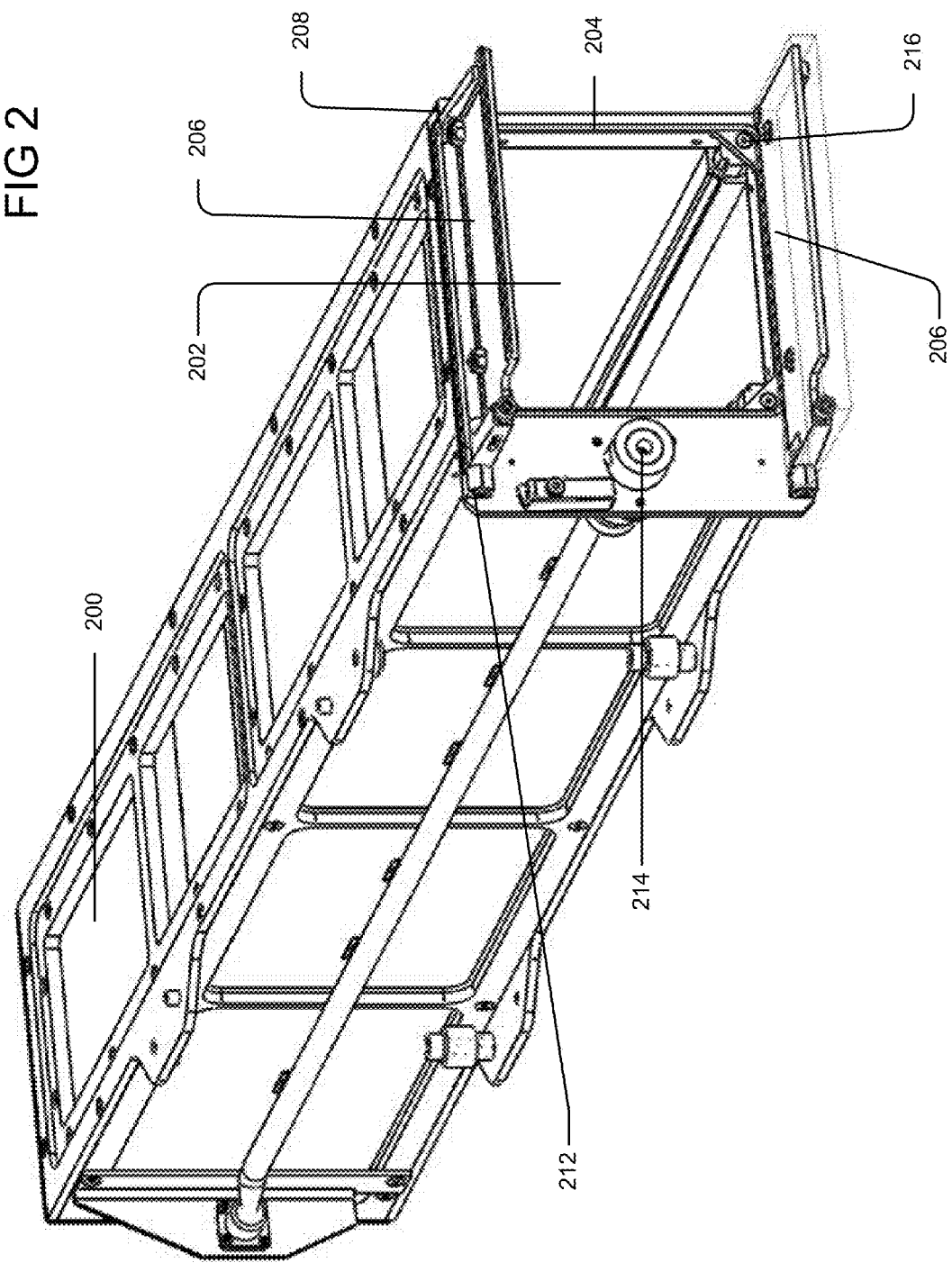
FIG. 2 depicts a deployer system having its door system in an open configuration.

FIG. 2 depicts an exemplary satellite deployer system with the door system 206 in the open position, wherein the locking mechanism 214 has been disengaged, and wherein the door system 206 has rotated about the hinges 212 approximately 90 degrees from a closed position. The door system 206 has been stopped at this 90 degree open position by having the door edge 210 mechanically engage the frame extension 208.

Figure 3:
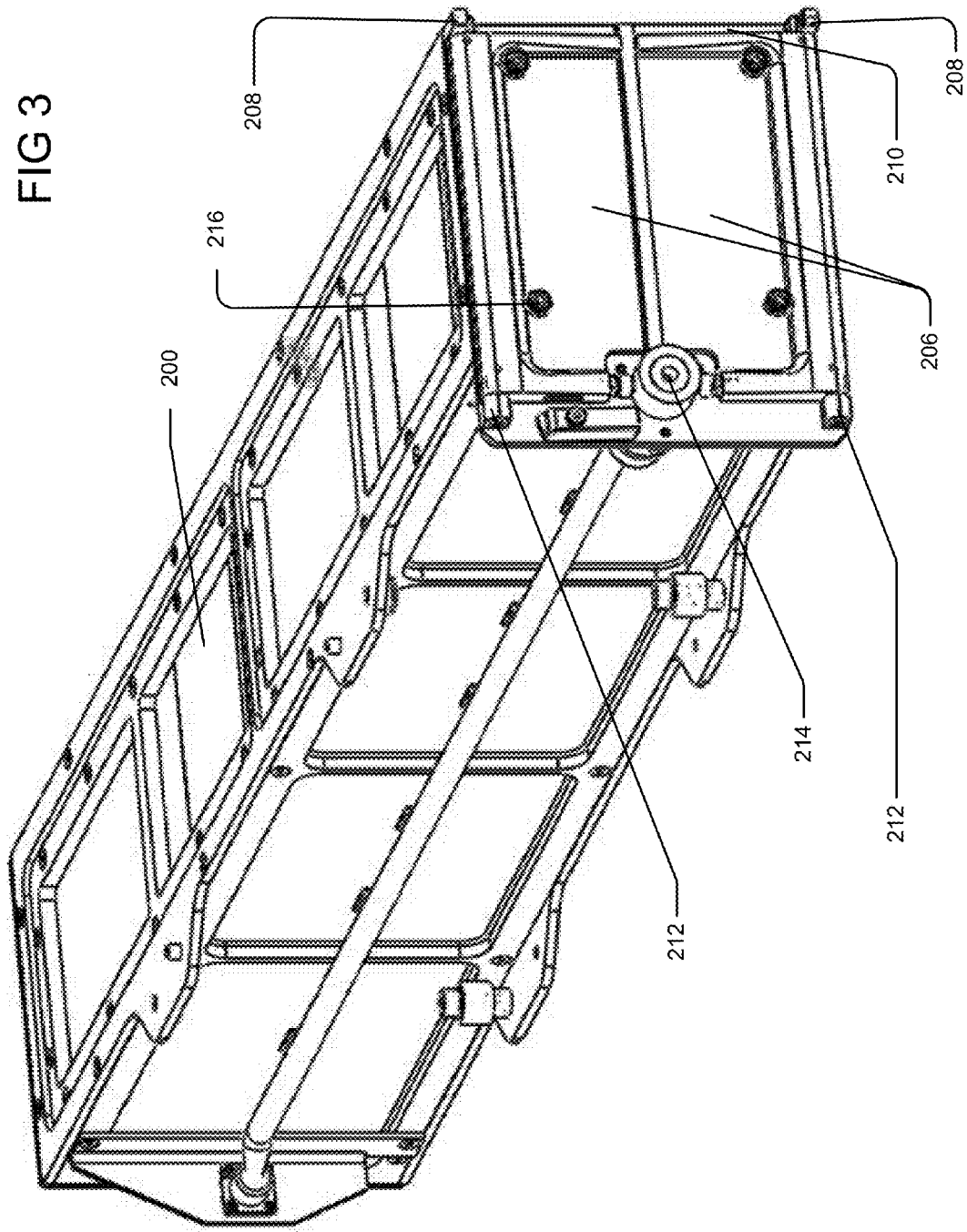
FIG. 3 depicts a deployer system having its door system in a closed configuration.

FIG. 3 provides a representation of an exemplary satellite deployer system with the door system 206 in a closed position, wherein the locking mechanism 214 is engaged and is preventing the door system 206 from rotating about the hinges 212.

Figure 4:
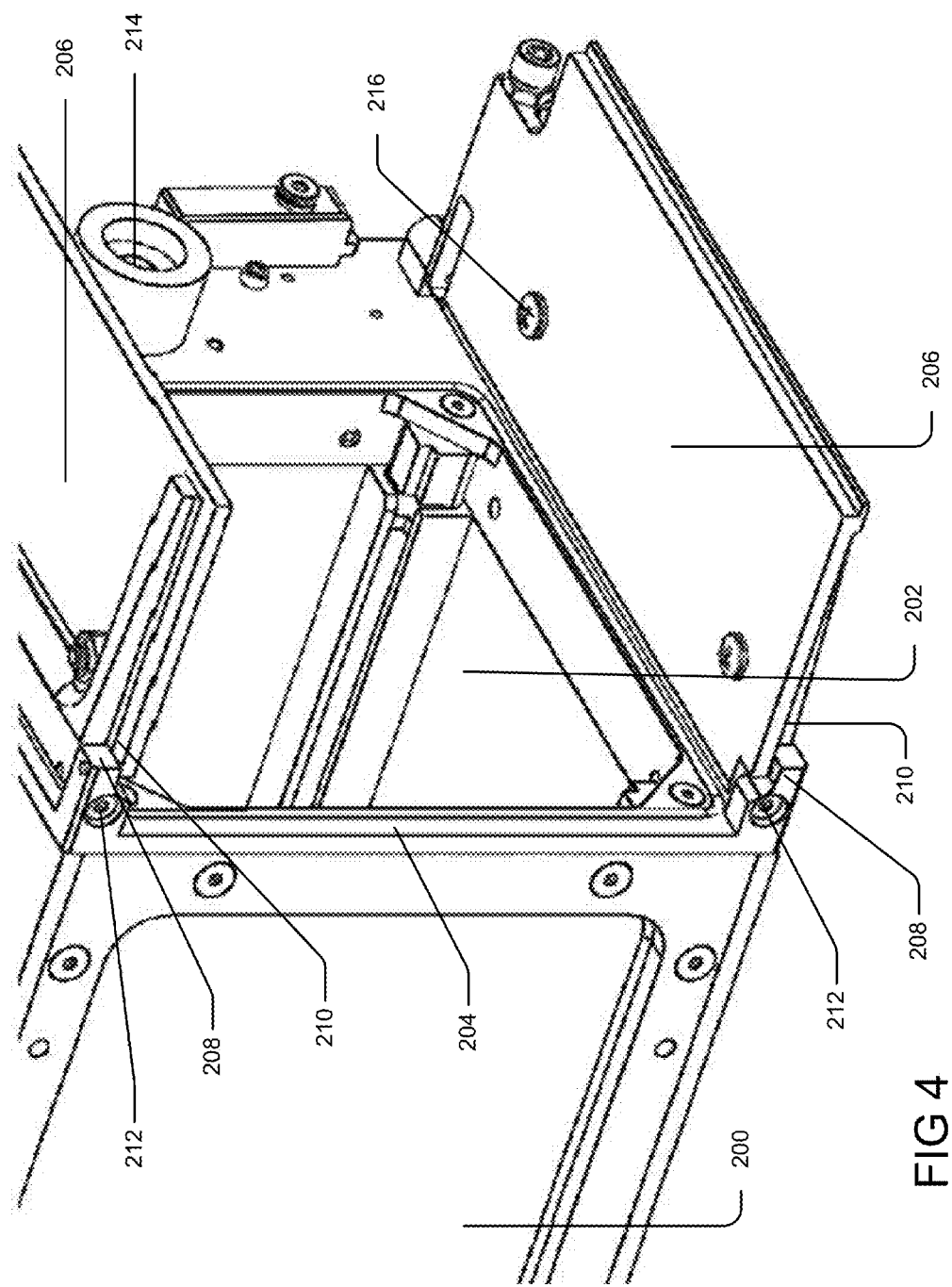
FIG. 4 shows a closer view of a deployer system having its door system in an open configuration.

FIG. 4 provides a closer view of an exemplary door mechanism enabling a 90° opening to be provided. The exemplary door system 206 depicted in FIG. 4 comprises two doors, each spanning approximately 50% of the open end 202 of the deployer's housing 200.

Figure 5:
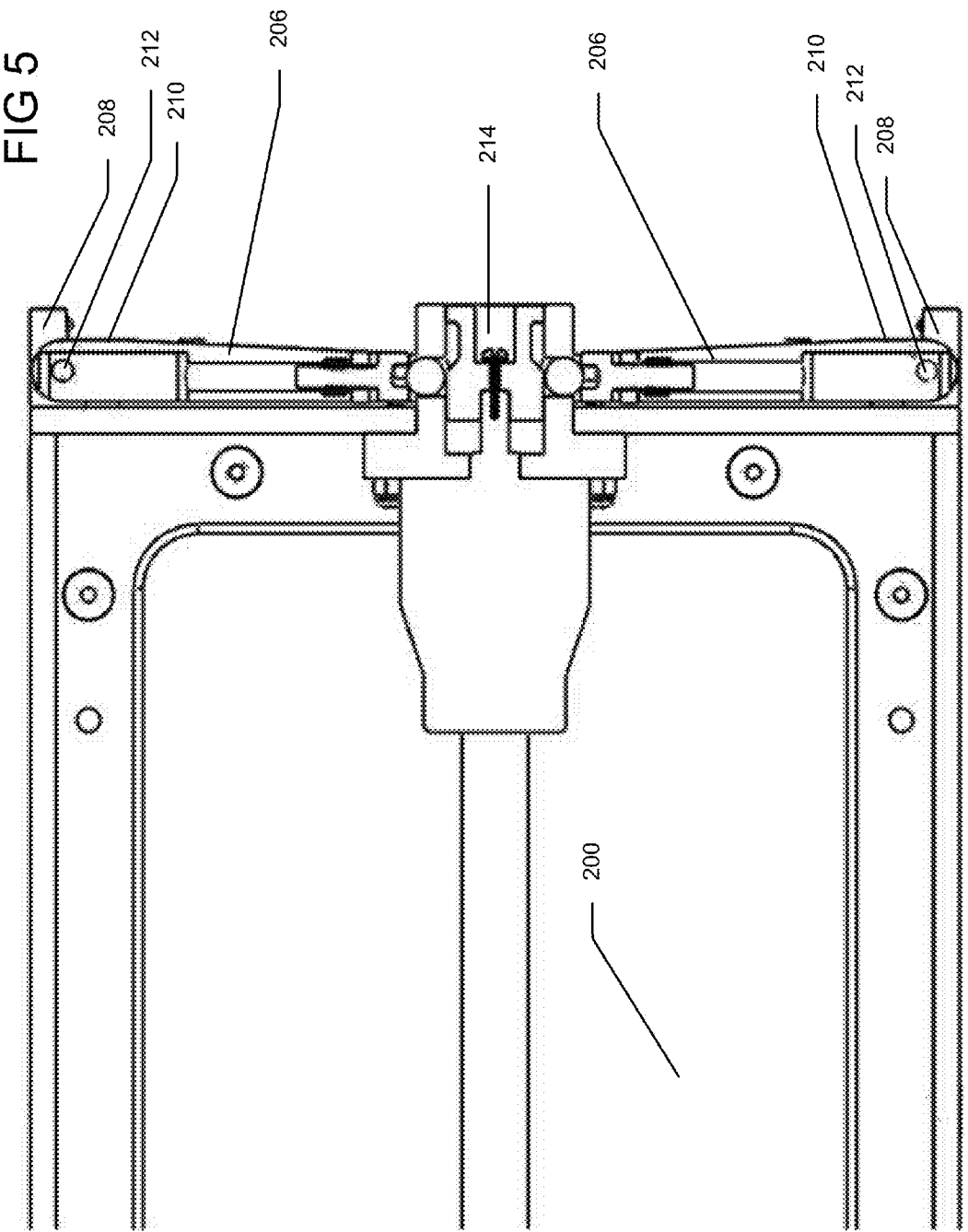
FIG. 5 depicts a ball lock mechanism in a closed configuration.

FIG. 5 illustrates a schematic representation of an exemplary door mechanism enabling a 90° opening to be provided. The exemplary door system 206 of FIG. 5 comprises two doors, each spanning approximately 50% of the open end 202 of the deployer's housing 200. The schematic of FIG. 5 depicts such a satellite deployer system having its door system 206 in a closed position. In the embodiment of the satellite deployer system depicted in FIG. 5 the frame extensions 208 are extending perpendicular (at a 90 degree angle) to both the door system 206 when the door system 206 is in the closed position, and to the door frame 204. In the embodiment depicted in FIG. 5 the frame extensions 208

Figure 6:
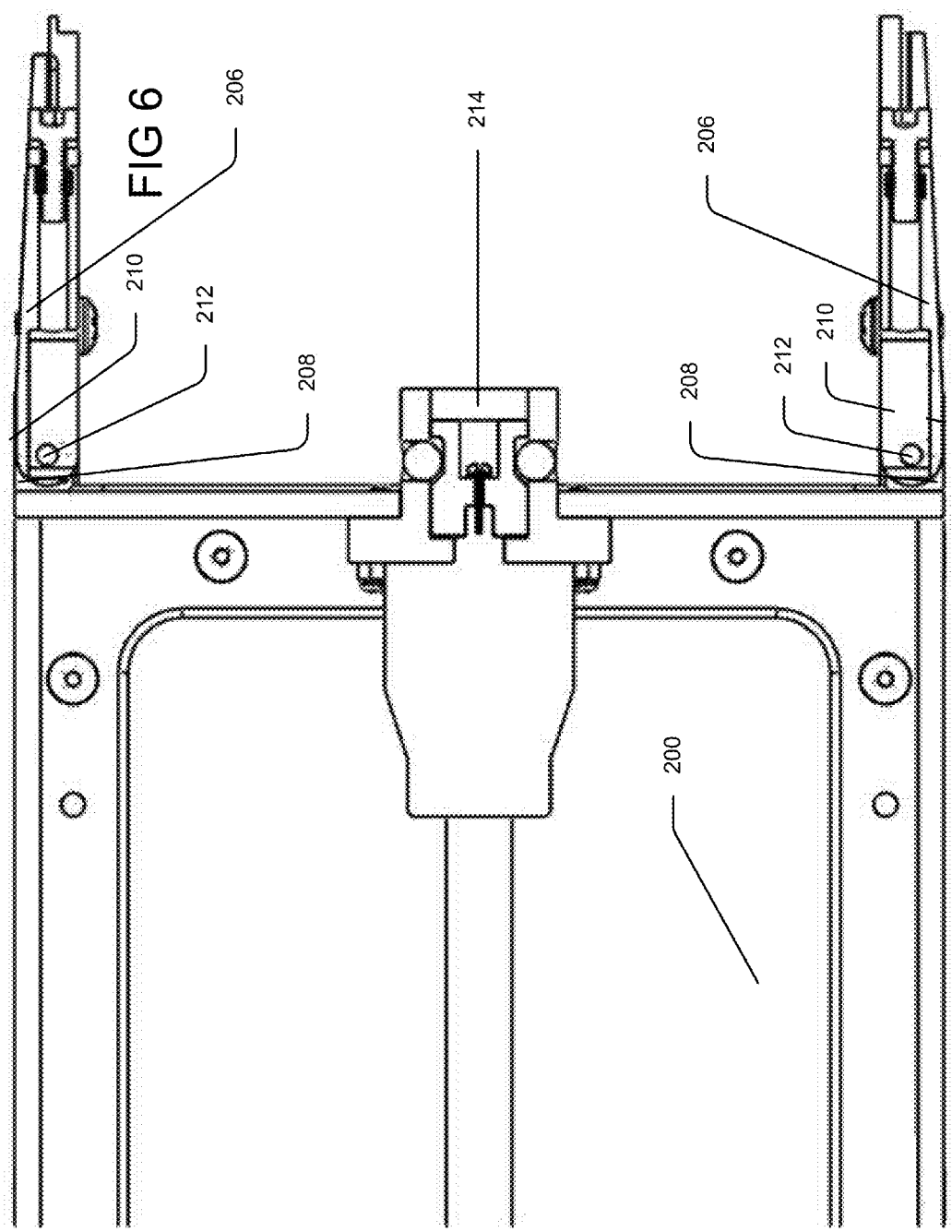
FIG. 6 depicts a ball lock mechanism in an open configuration.

FIG. 6 depicts a schematic representation of an exemplary door mechanism, having a locking mechanism 214 (in this depiction the locking mechanism 214 is a ball lock), wherein the locking mechanism 214 has been disengaged, allowing the door system 206 to rotate about the hinge 208 until the door system 206 has been stopped at the 90° point due to mechanical engagement between the frame extension 208 and the door edge 212.

Figure 7:
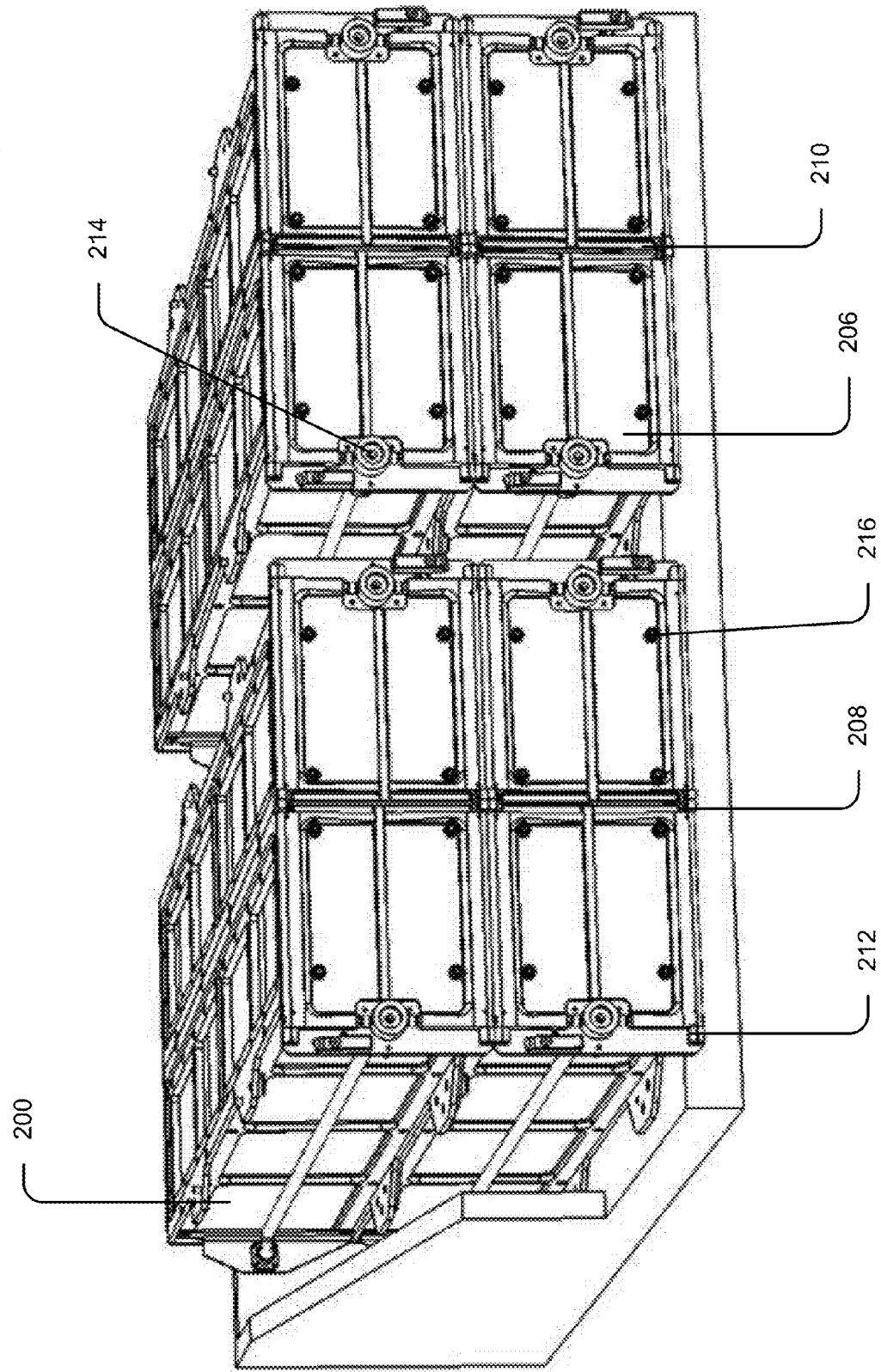
FIG. 7 shows eight satellite deployer systems in a matrix configuration.

FIG. 7 depicts a schematic representation of 8 satellite deployers configured in a matrix fashion, wherein the exterior surfaces of the satellite deployers' housings 200 are in physical contact with one another. In this depiction the satellite deployers have their door systems 206 configured in a closed position.

Figure 8:
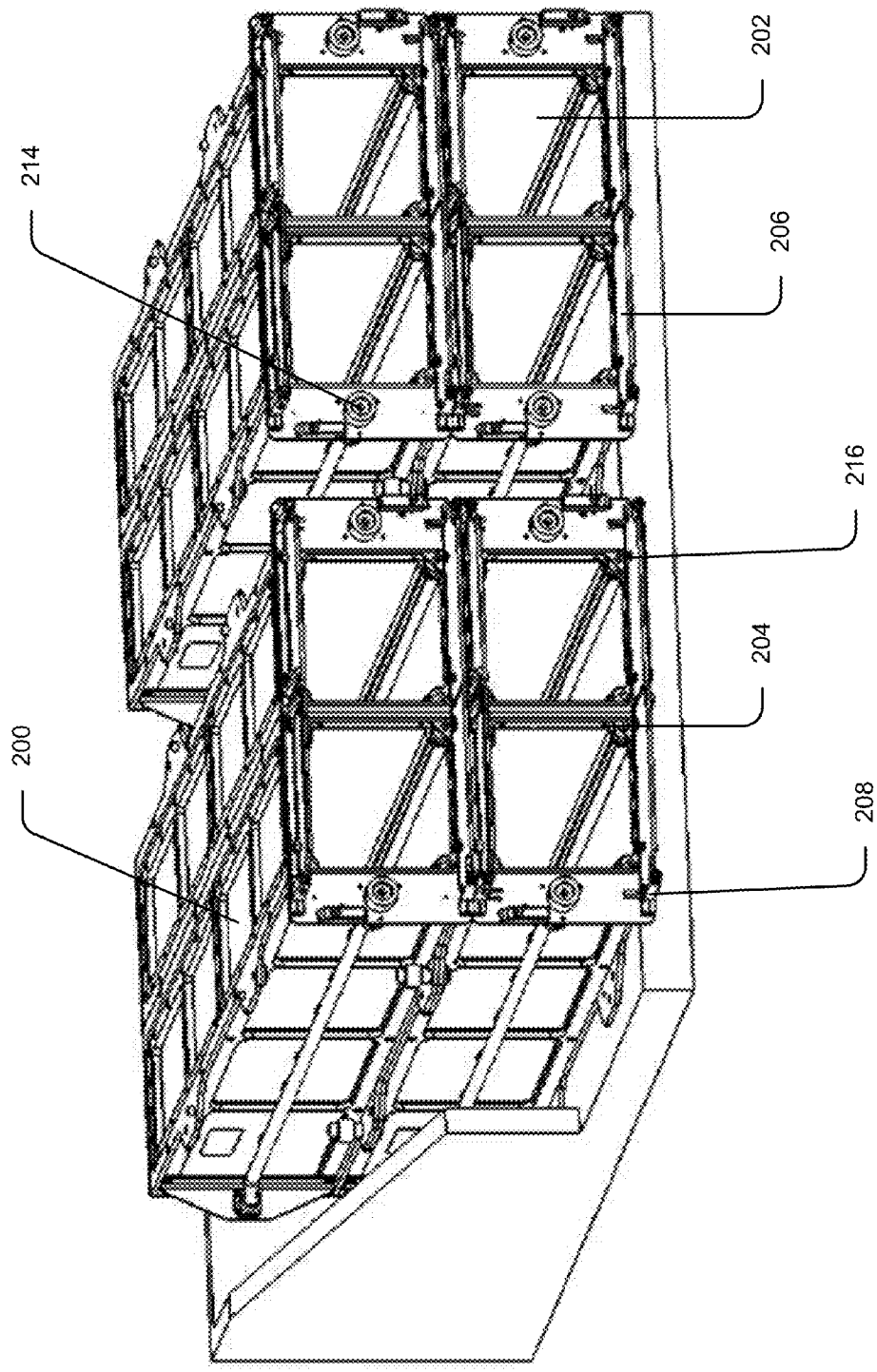
FIG. 8 shows eight satellite deployer systems with their door systems in the open position while configured in a matrix array, wherein each deployer is positioned such that it has two sides of its housing in mechanical contact with another satellite deployer system.

FIG. 8 depicts a schematic representation of 8 satellite deployers configured in a matrix fashion, wherein the exterior surfaces of the satellite deployers' housings 200 are in physical contact with one another. In this depiction the satellite deployers have their door systems 206 configured in an open position, showing the ability for the doors system 206 detailed in this disclosure to not impede in the envelop of adjacent deployer's door systems 206.

In one embodiment, the door mechanism for the satellite deployer may comprise a housing 200 having at least one open end 202 and an interior volume 202, a door frame 204 disposed about the perimeter of the housing's 200 open end 202, at least one frame extension 208, and a door system 206 connected to the door frame 204 by at least one hinge 212.

In one embodiment, the open end 202 of the deployer's housing 200 may be rectangular in shape.

An embodiment of the door frame 204 may comprise at least one horizontal component coupled to a horizontal portion of the housing's 200 open end 202, and at least one vertical component coupled to a vertical portion of the housing's 200 open end 202.

Embodiments of the door system 206 may be configured to allow the door system 206 to reversibly transition from a closed position, wherein the door system 206 completely occludes the open end 202 of the deployer's housing 200 to an open position, wherein the door system 206 does not occlude any portion of the open end 202 of the deployer's housing 200. In one embodiment, the open position may be achieved once the door system 206 has traveled approximately 90 degrees about the hinge 212.

In one embodiment, the door system 206 may consist of a single door. In an alternate embodiment, the door system 206 may comprise two doors, each of which may extend across a portion of the open end 202 of the housing 200 when in a closed configuration. In a further embodiment, the door system 206 may comprise a plurality of doors each of which may extend across a portion of the open end 202 of the housing 200 when in a closed configuration.

An embodiment of the frame extension 208 may be coupled to the door frame 204, and may extend perpendicularly from a component of the door frame 204. The frame extension 208 may be positioned so as to mechanically engage the door system 206 at the door edge 210 once the door system 206 has traveled approximately 90 degrees about the hinge 212. In an embodiment, once the door system 206 has traveled approximately 90 degrees about its hinge 212 from a closed configuration the door edge 210 may mechanically engage the frame extension 208 in such a manner that the frame extension 208 impedes the door system 206, preventing the door system 206 from any further rotation about the hinge 212.

In one embodiment, one or more hinges 212 may engage both the door frame 204 and the door system 206 at one or more hinge points, enabling the door system 206 to rotate about the hinge 212 in a manner that allows the doors system 206 to reversibly travel from a closed configuration to an open configuration.

Embodiments of the deployer housing 200, door frame 204, door system 206, and/or other components of the door mechanism may be made from any variety of, or combination of, materials suitable for exposure to and use in space. Such materials are well known in the art.

Embodiments of the satellite deployer door mechanism may comprise a locking mechanism 214. The locking mechanism 214 may be used to releasibly secure the door system 206 in place when the door system 206 is configured in a closed position. The locking mechanism 214 may be positioned at the confluence of the plurality of doors in the event that the door system 206 comprises a plurality of doors. Alternatively, the locking mechanism 214 may be positioned between the door system 206 and the door frame 204. In one embodiment the locking mechanism 214 may be a ball lock mechanism. Some embodiments may provide for the locking system 214 to be activated by one or more of a plurality of independent electronic or mechanical circuits, or a combination thereof.

Embodiments of the door mechanism may comprise one or more Load Points 216. Embodiments of the Load Points 216 may be positioned close to the hinges 212 so as to maximize the mechanical load exerted on the hinge 212 and minimize the mechanical load exerted on the locking mechanism 214. Embodiments of the satellite deployer may have a mounting system integrated with, or attached to, the exterior surface of the housing 200, which may be used to secure the satellite deployer housing 200 to an external structure. Such external structures may include, but are not limited to, space transport vehicles, interior walls of a cargo bay, or the housing of another satellite deployer, etc.

CubeSat Storage:

In an embodiment of the disclosure, the satellite deployer's door system 206 may be configured such that two doors may extend halfway across the satellite deployer housing's 200 open end 202. The door system 206, when in the fully open position, will have rotated 90 degrees about its hinge 212 relative to the door system's 206 closed position. When in the open position, the door system 206 may be in plane (forming a 180 degree angle) with the internal face of the walls of the satellite deployer housing 200 to which the door system 206 is attached. By making the door system 206 open to the 90 degree position, the satellite deployer system can ensure that the door system 206 will not impede the egress of the space payload (i.e. a CubeSat 100) when they are ejected/deployed.

Additionally, by making the door system 206 of the satellite deployer extend no further than the aforementioned 90 degree position, it may be ensured that the travel path of the door system 206 will not encroach on the travel path of another CubeSat deployer' door system 206 placed adjacent to the first CubeSat Deployer, even if the systems are positioned such that the face of the exterior walls of two deployers' housings 200 are in lateral physical contact. The ability of the CubeSat Deployer system to be both stored, and used for deploying space payloads, while in very close physical proximity with one another without hindering their ability to operate effectively is a significant advantage over deployers currently known in the art. This feature is of particular importance given that the nature of space transport often calls for minimizing the consumption of a limited volume while maintaining as much utility as possible.

Door Mechanism:

In one embodiment of the present disclosure, the door system 206 may comprise two separate doors, with each extending halfway across the satellite deployer housing's 200 open end 202 when in a closed position.

In an embodiment, the doors may be connected to the open end 202 of the housing 200 at one or more hinge points.

In an embodiment, the door-to-housing hinge-joint may be configured such that the door system 206 opens outward to a 90 degree angle. By having the door system 206 open to a 90 degree angle it is possible for there to be no impedance of the ejection of the payload. Additionally, the 90 degree door opening allows for the travel path of the door system 206 to not interfere with that of the travel path of any other similar satellite deployer's door system 206 when the satellite deployers are positioned next to one another in a matrix fashion, thus allowing for a maximum number of satellite deployer systems, and thus maximum payload deployment capability, in a minimum of space.

In one embodiment of the present disclosure, the contact points between the payload and the door system 206 ("Load Points" 216) are positioned close to the hinges 212. Placing said Load Points 206 close to the hinges 212 allows the mechanical load on the hinges 212 to be maximized while the load on the locking mechanism 214 is minimized.

In an embodiment of the disclosure, during the transportation process, the door system 206 of the satellite deployer system may be held in a closed position in which the door system 206 fully occlude the open end 202 of the satellite deployer system's housing 200 by a locking mechanism 214.

In another embodiment, the locking mechanism 214 may be resetably engageable.

In another embodiment, the locking mechanism 214 may be resetably disengageable.

In an embodiment, the locking mechanism 214 may be both resetably engageable and resetably disengageable.

In another embodiment, the locking mechanism 214 may be resetably disengageable through the operation of any of a plurality of independent circuits.

In a further embodiment, the locking mechanism 214 may be resetably disengageable through the operation of one or more of a plurality independent circuits.

Locking Mechanism:

In one embodiment the locking mechanism 214 used to maintain the door mechanism 206 in a closed position during storage and transport is a ball-lock mechanism. Such a ball-lock mechanism uses ball bearings recessed into the interior wall of the ball-lock mechanism coupled with one or more adjusting screws to maintain mechanical connection between the elements of the locking system.

In an embodiment, the ball-lock mechanism is engageable through the insertion of a pin from a disengaged position through the activation of a pin-puller mechanism.

In an embodiment, the ball-lock mechanism is disengageable through the retraction of a pin from an engaged position through the activation of a pin-puller mechanism.

In one embodiment, the pin retraction used to disengage the ball-lock mechanism may be achieved by coupling the characteristics of shape memory alloy with a Dent Mechanism.

In an embodiment, the pin-puller mechanism may be resetably engageable.

In another embodiment, the pin-puller mechanism may be resetably disengageable.

In a further embodiment, the pin-puller mechanism may be both resetably engageable and resetably disengageable.

The resetably engageable and disengageable pin-puller mechanism allows for the ball-lock mechanism to be repeatedly engaged and/or disengaged. This in turn allows the doors of the system to be repeatedly opened and/or closed.

In an embodiment, the pin-puller mechanism may be triggered by any of a plurality of independent circuits, such that there is redundancy in the locking mechanism's operation system.

Payload Deployment:

Space payload deployment may be achieved when the one or more circuits controlling the locking mechanism 214 are activated, resulting in the disengagement of the locking mechanism 214, allowing for the door system 206 to rotate to the 90 degree open position, at which time an ejection mechanism is used to impart a force on the payloads stored inside of the system's interior volume 202, resulting in the ejection of said payload from said system's interior volume 202 into the surrounding space through the system's (now) open end 202.

In an embodiment, the space payload deploying system is configured such that each space payload deploying system can retain, transport, and deploy up to eight CubeSats at any given time.

In an embodiment, the space payload deploying system is configured such that six deployers, arranged in a matrix configuration, may pass through a standard space station airlock at the same time.

Combining the two embodiments described immediately above may allow for the deployment of 48 CubeSats in one cycle of an airlock.

In an embodiment, the space payload may comprise satellites.

In an embodiment, the space payload may comprise picosatellites.

In a further embodiment, the space payload may comprise CubeSats.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

What is claimed is:

1. A door mechanism configured for the storing, transporting, and deploying of a space payload through an unencumbered exit path during outer space deployment of said space payload, the door mechanism comprising:
    a housing having an open end, a perimeter about the open end, an interior volume, and a longitudinal axis extending along the length of the housing, the housing configured for storage of the space payload;
    a door frame disposed about the perimeter of said open end without encumbrance of the open end, the door frame comprising a shape different than that of the perimeter of the open end;
    a first frame extension extending perpendicularly from said door frame adjacent a first corner of the open end;
    a second frame extension extending perpendicularly from said door frame adjacent a second corner of the open end, the first and second frame extension positioned on a same edge of the perimeter of the open end;
    a door comprising a door edge, wherein said door is movable from a closed position, in which said door at least partially occludes said open end, to an open position, in which said door is parallel to said first and second frame extension and said longitudinal housing and said door edge mechanically engages with said first and second frame extension to prevent movement of said door beyond the perimeter of the open end when the space payload is deployed from the housing during outer space deployment of said space payload; and
    a top hinge and a bottom hinge engaging said door frame and said door for permitting rotational movement of said door along an axis defined by said hinge, said axis parallel to a longitudinal axis of said door, said rotation of said door enabling said door to travel reversibly from said closed position to said open position to provide a clear path for the space payload to be deployed in outer space, the top hinge including a top protrusion, the bottom hinge including a bottom protrusion, the top and bottom protrusions extending perpendicular to the first and second frame extension, the door including a top cutaway portion and a bottom cutaway portion that traverse the top and bottom protrusion when the door is moved from the closed position to the open position, the top hinge and the bottom hinge positioned perpendicular to the first frame extension and the second frame extension;
    wherein the door edge mechanically engages the first frame extension and the second frame extension when the door is in an open position to provide a clear path for the space payload to be deployed in outer space.

2. The door mechanism of claim 1, further comprising a locking mechanism for releasably retaining said door in said closed position, wherein at least a portion of the locking mechanism is not affixed to the door.

3. The door mechanism of claim 1, wherein said open position is approximately 90 degrees rotated about said hinge from said closed position.

4. The door mechanism of claim 2, wherein said locking mechanism comprises a ball lock.

5. The door mechanism of claim 1, wherein said door further comprises a load point spaced apart from said hinge.

6. The door mechanism of claim 2, further comprising at least one circuit adapted to trigger said locking mechanism.

7. The door mechanism of claim 1, wherein said door comprises two or more door sections, wherein each of said door sections extends partially across said open end when in said closed position.

8. The door mechanism of claim 7, wherein said door comprises two door sections, and wherein each of said door sections extends approximately halfway across said open end when said door is in said closed position.

9. The door mechanism of claim 1, wherein said open end comprises a rectangular shape.

10. The door mechanism of claim 1, wherein a second door mechanism is position immediately adjacent to said door mechanism, wherein via configuration of said door mechanism opening of said door does not encumber opening of a second door of said second door mechanism.

11. The door mechanism of claim 10, wherein at least said door mechanism and at least a second door mechanism, third door mechanism, and fourth door mechanism are arranged in a matrix fashion.

* * * * *

UNITED STATES PATENT AND TRADEMARK OFFICE
CERTIFICATE OF CORRECTION

PATENT NO.         : 9,567,115 B2
APPLICATION NO.    : 14/445271
DATED              : February 14, 2017
INVENTOR(S)        : Victor Dube Page 1 of 1

It is certified that error appears in the above-identified patent and that said Letters Patent is hereby corrected as shown below:

In the Specification

Column 1, after the title and before FIELD OF THE INVENTION:
Insert the following:
--This invention was made with Government support under N68335-17-C-0506 awarded by the Department of the Navy. The Government has certain rights in this invention.--.

Signed and Sealed this
Twenty-fourth Day of March, 2020

Andrei Iancu
*Director of the United States Patent and Trademark Office*